June 23, 1931. W. P. BANCROFT 1,811,604
GARDEN TOOL
Filed Feb. 11, 1929
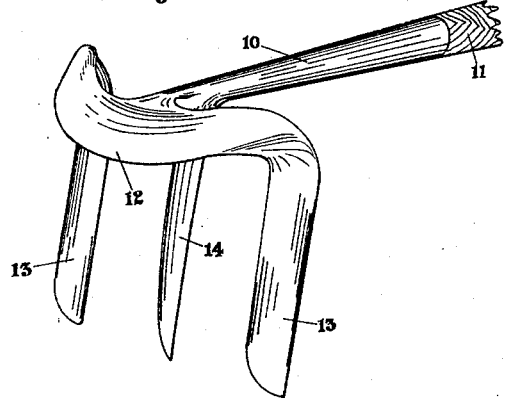
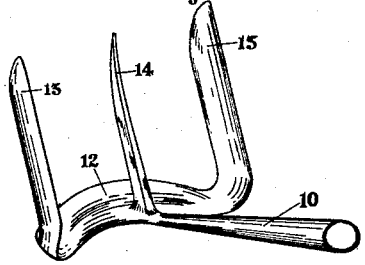
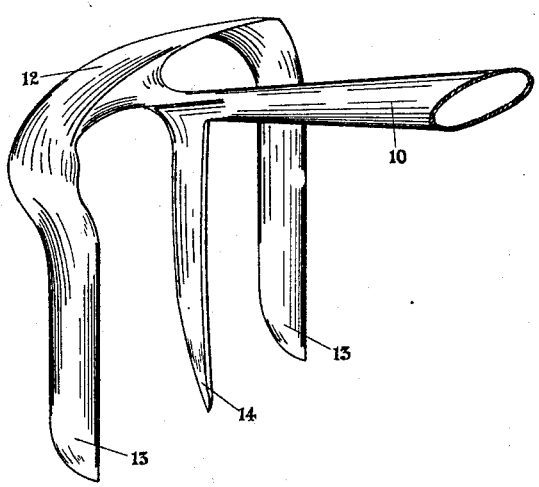
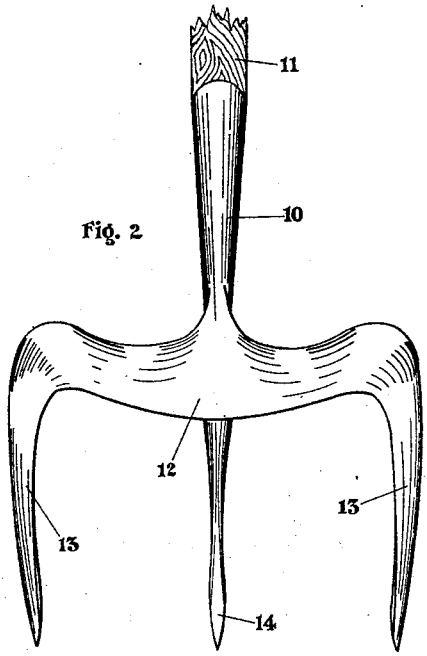
Inventor
W. P. Bancroft
By Emil F. Lange
Attorney Patented June 23, 1931

1,811,604

UNITED STATES PATENT OFFICE

WILLIAM P. BANCROFT, OF LINCOLN, NEBRASKA

GARDEN TOOL

Application filed February 11, 1929. Serial No. 339,233.

My invention relates to garden tools and more particularly to garden tools of the hoe type.

It is my object to provide a garden tool of integral construction which may be used either as a push hoe or as a pull hoe and which is provided with cutting edges which permit its use in any one of numerous positions of the tool.

It is also my object to provide lateral depending blades which may serve as weeders and to provide one or more intermediate tines so spaced from the blades and so positioned that the tool will not become clogged with trash.

Other objects will be pointed out in the following description.

In the drawings all views are in perspective.

Figure 1 showing the tool as seen from the front and slightly to one side,

Figure 2 showing the tool as seen directly from the front and slightly above,

Figure 3 showing the tool as seen from the rear and slightly to one side, and

Figure 4 showing the tool in reduced scale and as seen from the rear and to one side when the tool is in position for the use of the transverse blade.

The tool is made largely by cutting and bending a strip of sheet steel into the form shown in the drawings, and by securing thereto and in integral relation therewith a ferrule having one or more tines depending therefrom. The ferrule 10 or its mechanical equivalent is preferably welded or similarly secured to the operative portion of the tool and it is designed to be secured to the handle 11. The blade portion 12 projects forwardly from the ferrule 10, and assuming that the ferrule is in horizontal position, the blade 12 is downwardly inclined when the tool has the position shown in Figure 1. The blade 12 is substantially flat on its upper surface, being merely rounded sufficiently from front to rear to prevent its digging too deeply into the soil when the tool is used as a push hoe with the tines projecting upwardly. The front sharpened edge of the blade 12 is convex in outline while the rear sharpened edges are substantially concave. The blade 12 is further provided on its rear edge with a shank to which the intermediate tine or tines are secured and to which the ferrule is also secured.

The two tines 13 are formed by bending down the end portions of the strip at the ends of the blade 12. These tines lie in vertical planes which converge forwardly, and both their front and rear vertical edges are sharpened. The intermediate tine 14 is secured to the shank of the blade 12 so as to be in the rear of and parallel with the tines 13. By placing the tine or tines 14 sufficiently far in the rear of the tines 13, the spaces between the tine 14 and the tines 13 will afford ample clearance for any trash which the tool may gather in the soil. The tine 14 is sharpened at only the upper portion of its front edge. The tines 13 and 14 terminate in almost a common plane, the tine 14 being but a very trifle shorter than the tines 13.

In use, the tool may serve as a garden cultivator for loosening the soil to a considerable depth by holding the tool in the position shown in Figures 1 and 3. When a slight surface mulch is desired or when very small weeds are to be killed, the tool may be turned over on its side so as to bring into play the cutting edges of either tine 13. In this position particularly the double edge will be found to be useful in enabling the operator to give either a pushing stroke or a pulling stroke when the first stroke has not fully accomplished its purpose, and to do this without taking a step to alter his position. The blade 12 also may be used for mulching the surface of the soil, and for deep mulches the blade 12 will be superior to the blades 13 when the tool is operated on its side. With the blade 12 again, the operator is enabled to give the tool either a push or a pull stroke without altering his position. The blade 12 also is useful in destroying heavy weeds. A thrust in a forward direction will cause the sharpened forward edge of the blade 12 to chop the weed immediately below the surface of the soil. If the weed is particularly tenacious, a pull stroke with the sharpened rear edge of the blade 12 will usually sever the weed below the surface of the soil, the advantage of the rear edge in such cases being that the weed is caught against the concave knife edge and is subjected to the shearing action of that knife edge.

From the foregoing description it will be obvious that the operation of the garden tool is extremely simple and that the tool is capable of performing any operation required in working gardens and small fields. The tool serves both as a push hoe and as a pull hoe and it may be placed in any position. For deep cultivations the position shown in Figures 1 and 3 enables the operator to work the soil the full depth of the tines 13 and 14. For extremely shallow cultivation the tool may be turned on either side to bring into play the cutting edges of the tines 13 to merely slice the crust of the soil. If this crust is too hard, the tool may be placed in the position shown in Figure 4 in order to bring the blade 12 into operation either as a push hoe or as a pull hoe and in which case the hardest crust may readily be broken up. For small weeds such as seedlings, the tines 13 when operating with the hoe positioned on its sides, will not only shave the top layer of soil but will also detach small weeds from the soil. If the weeds are larger, the blade 12 will sever them immediately below the surface of the soil so as to insure their destruction. The tool may also be used so as to bring into play one of the cutting edges at either corner between the blade 12 and a tine 13. This is a particularly effective position when it is desired to cut out weeds which are close to cultivated plants in the row since only a narrow slice of soil is shaved out when the tool is in this position.

Having thus described my invention in such full, clear, and exact terms that its construction and operation will be readily understood by others skilled in the art to which it pertains, what I claim as new and desire to secure by Letters Patent of the United States is:

1. In a garden tool, an earth working member adapted for attachment to a handle, said member including a flattened intermediate portion having a covex surface and having a front convex cutting edge and a rear concave cutting edge, and a pair of tines projecting from said intermediate portion at the extremities thereof, said tines being each substantially perpendicular to said intermediate portion, and a handle secured to said tool at a point in close proximity to the rear concave edge of said intermediate portion to extend rearwardly therefrom, the inclination of said handle to said intermediate portion being such that said tool may be reversed to operatively position either said intermediate portion or said tines in the soil.

2. A garden tool having a flattened intermediate portion and a pair of flattened tines projecting therefrom at the extremities thereof, said intermediate portion and said tines being each provided with front and rear cutting edges, and means for securing a handle to said intermediate portion to project rearwardly therefrom, said means inclined rearwardly from said intermediate portion and in the direction of said tines but terminating appreciably short of the free extremities thereof whereby said garden tool is reversible to operatively position the cutting edges of either said intermediate portion or said tines.

3. In a garden tool, an earth working member including a flattened intermediate portion with a pair of flattened tines projecting therefrom at the extremities thereof, said intermediate portion having a front convex cutting edge and a pair of rear concave cutting edges, and a handle projecting rearwardly from said intermediate portion in close proximity to the median point in the rear edge thereof, the inclination of said handle to said intermediate portion being such that said tool may be reversed to operatively position either said intermediate portion or said tines in the soil.

In testimony whereof I affix my signature.

WILLIAM P. BANCROFT.